(12) United States Patent
Takeuchi

(10) Patent No.: US 6,775,596 B2
(45) Date of Patent: Aug. 10, 2004

(54) INFORMATION PROCESSING SYSTEM, INFORMATION PROCESSING APPARATUS AND METHOD, RECORDING MEDIUM, AND PROGRAM

(75) Inventor: Isao Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/238,109

(22) Filed: Sep. 10, 2002

(65) Prior Publication Data

US 2003/0074500 A1 Apr. 17, 2003

(30) Foreign Application Priority Data

Sep. 12, 2001 (JP) .......................................... 2001-275987

(51) Int. Cl.[7] .............................................. G05D 11/00
(52) U.S. Cl. ................................. 700/291; 340/310.01
(58) Field of Search ............................... 700/291, 295, 700/297, 298; 340/310.01, 310.02, 310.06, 310.07

(56) References Cited

U.S. PATENT DOCUMENTS

| | | | | |
|---|---|---|---|---|
| 6,218,931 B1 | * | 4/2001 | Asghar et al. | 340/310.02 |
| 6,326,884 B1 | * | 12/2001 | Wohlrabe | 340/310.02 |
| 6,465,903 B1 | * | 10/2002 | Wuidart et al. | 307/3 |
| 6,563,419 B1 | * | 5/2003 | Herz et al. | 340/310.01 |
| 6,665,384 B2 | * | 12/2003 | Daum et al. | 379/102.03 |
| 6,678,285 B1 | * | 1/2004 | Garg | 370/473 |

* cited by examiner

*Primary Examiner*—Leo Picard
*Assistant Examiner*—Zoila Cabrera
(74) *Attorney, Agent, or Firm*—Frommer Lawrence & Haug LLP; William S. Frommer

(57) ABSTRACT

A simple, safe domestic network for electric appliances in which data is sent by modulating the voltage or current signals of power supply and corrections are made in response to electric appliances varying in load.

8 Claims, 24 Drawing Sheets

82

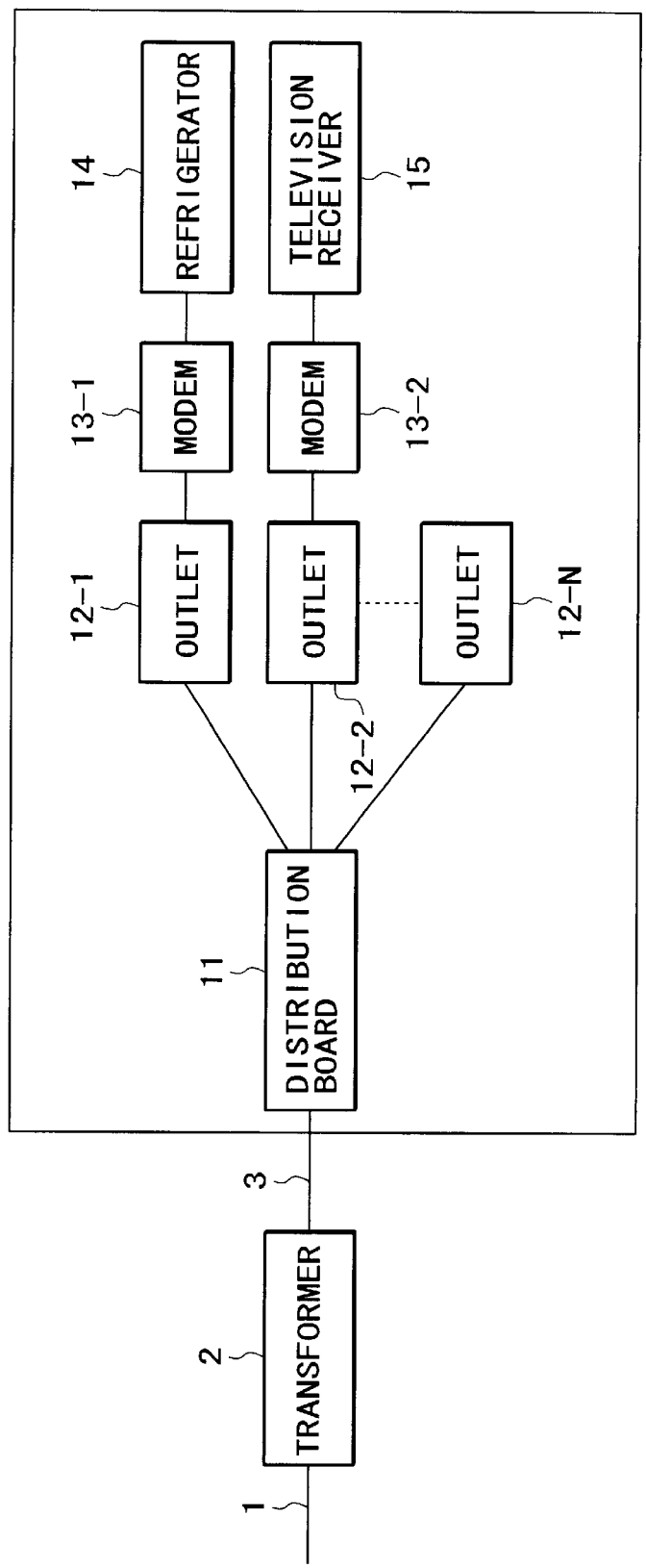
F I G. 1

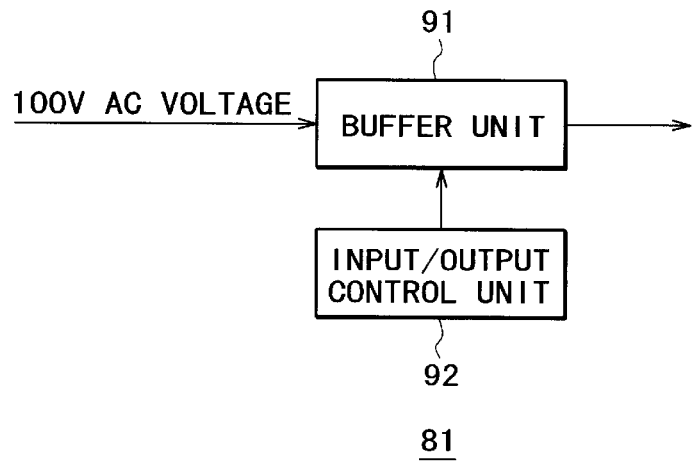
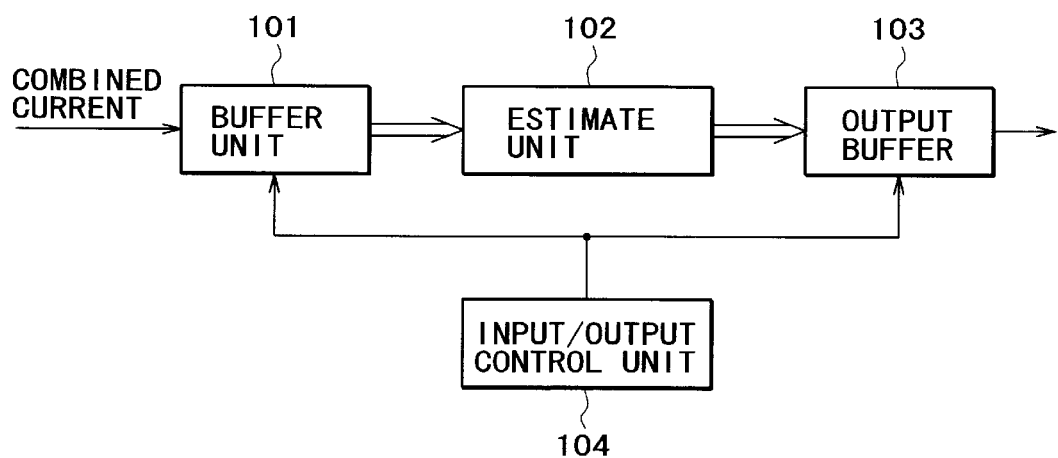

F I G. 1 0
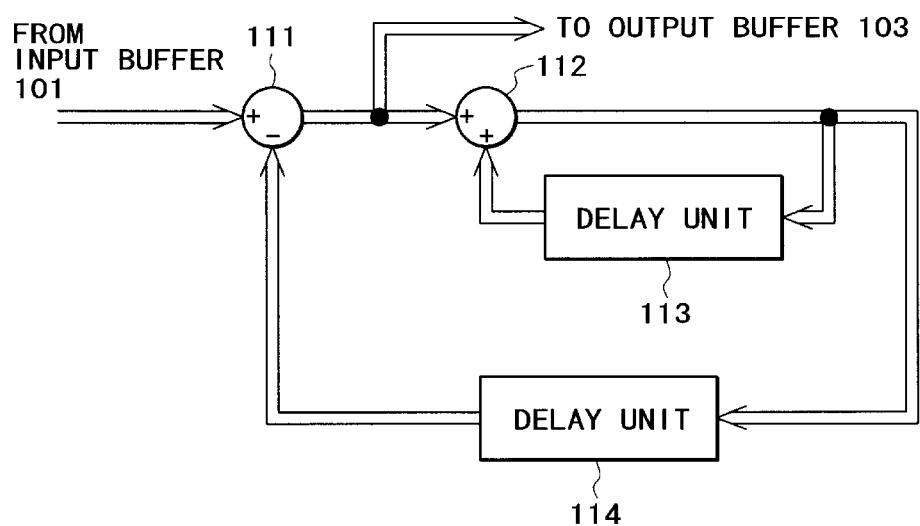

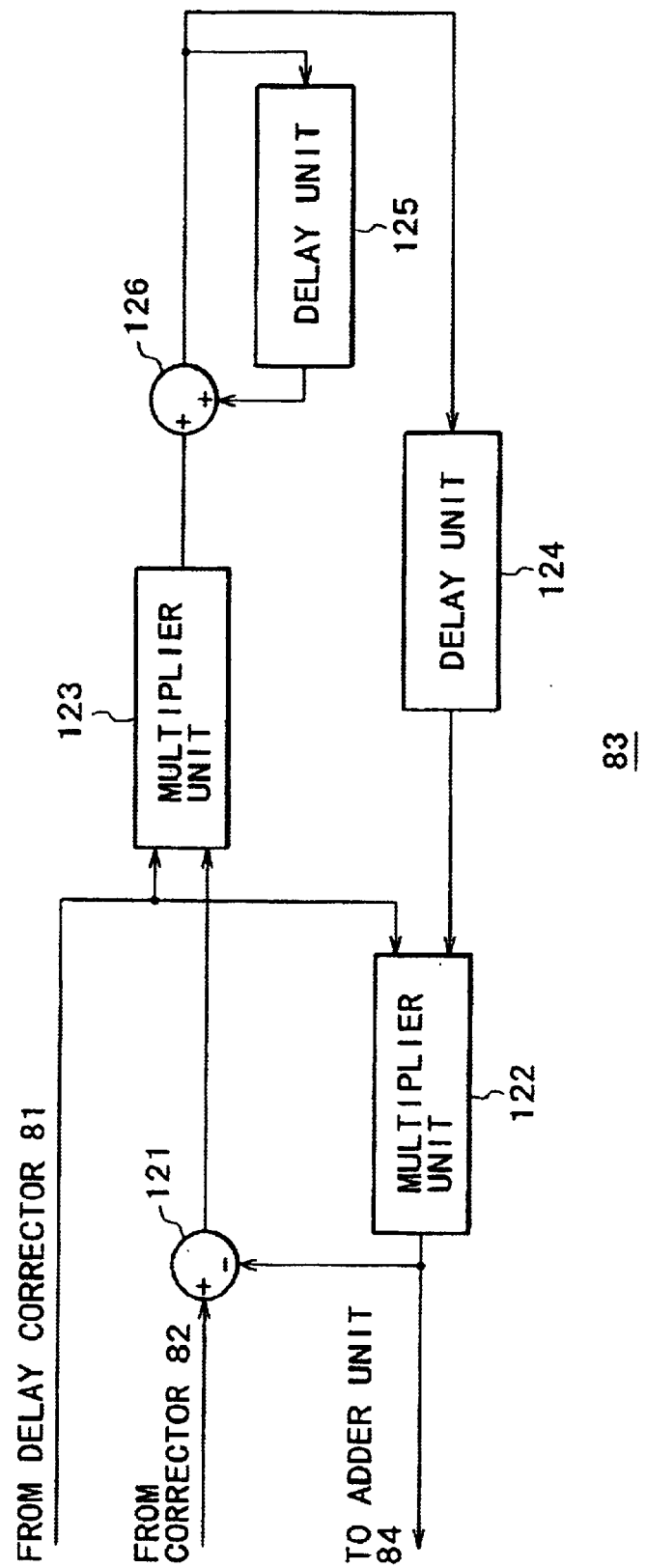

F I G. 1 3
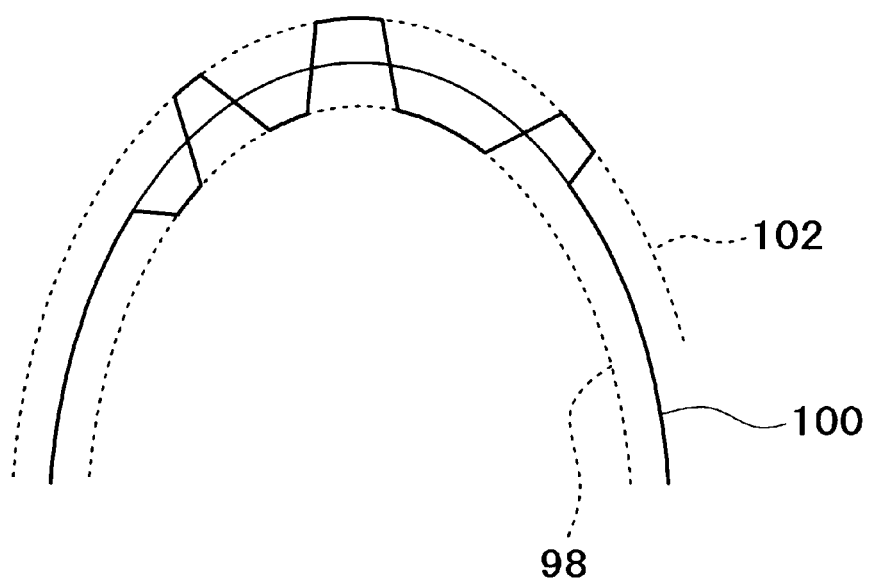

F I G. 1 4
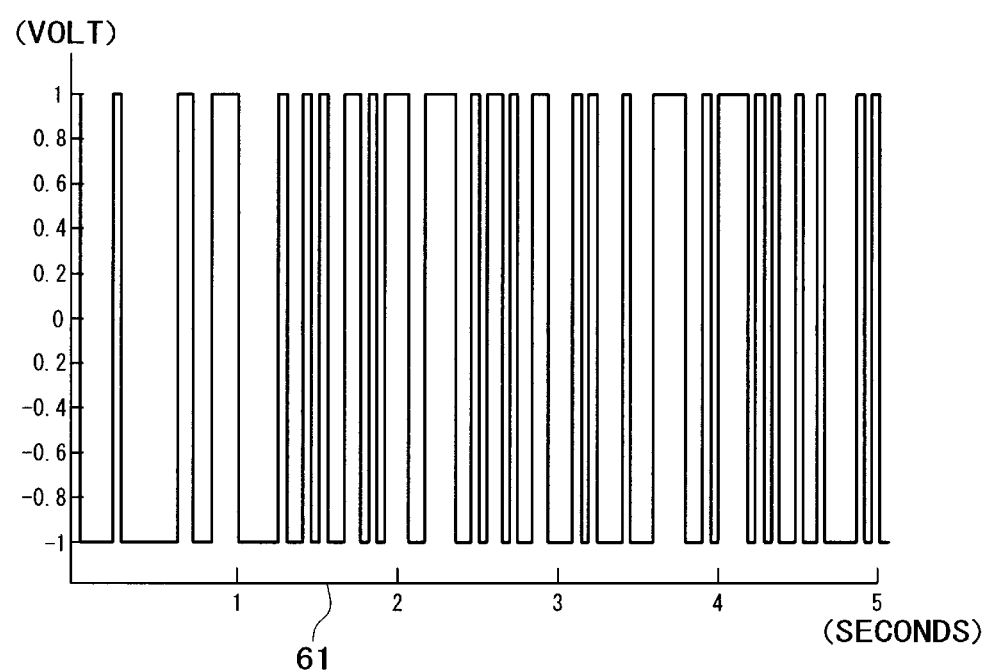

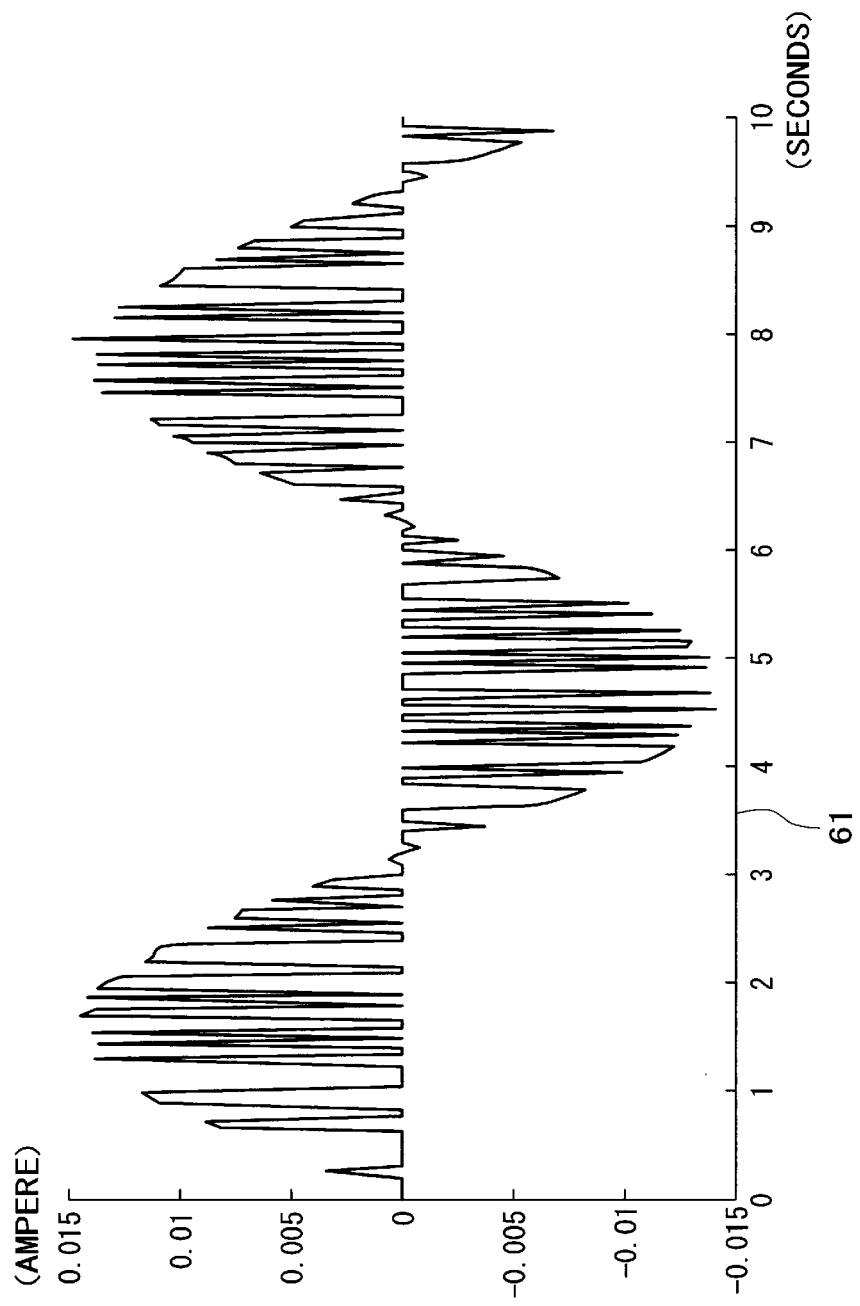

F I G. 1 7
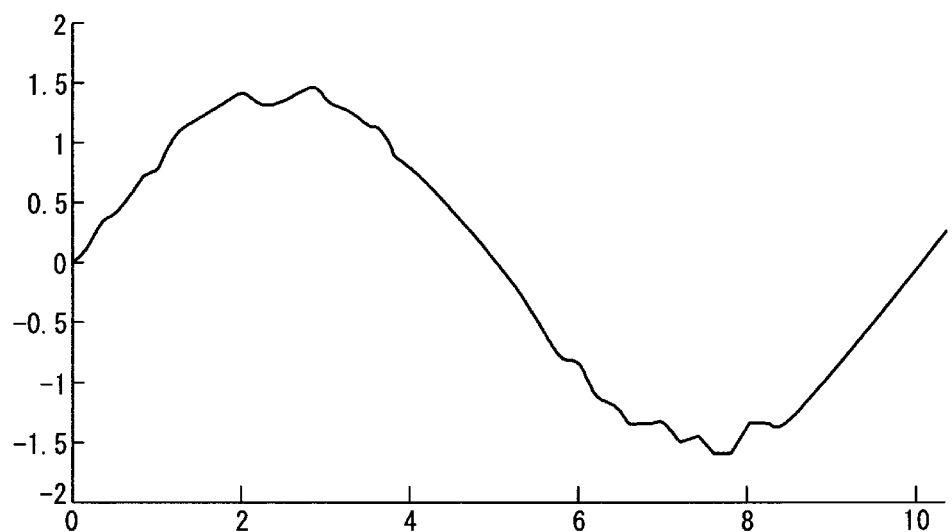
F I G. 1 8
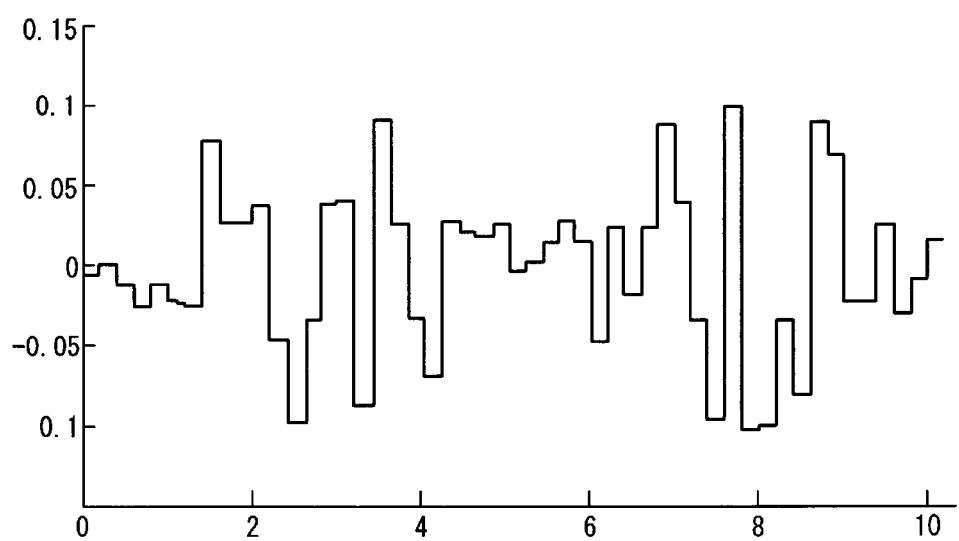

F I G. 2 3
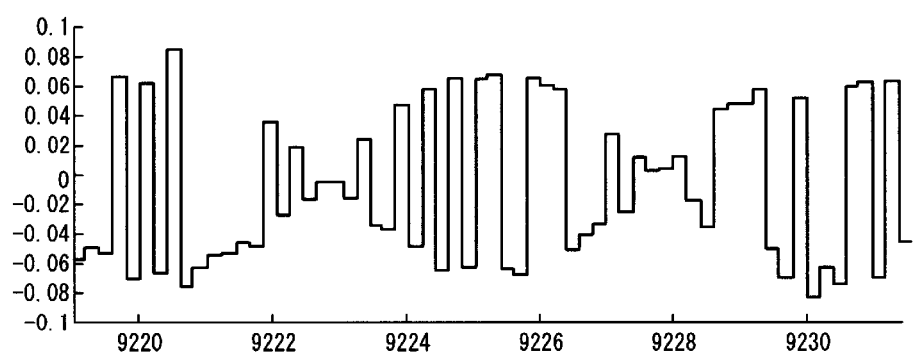
F I G. 2 4
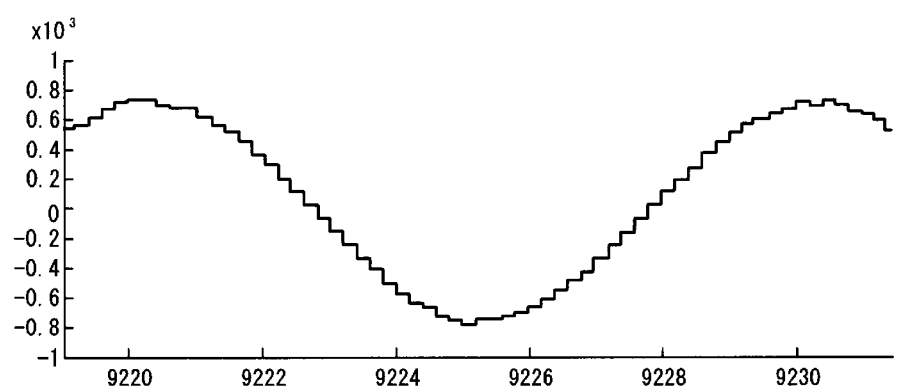

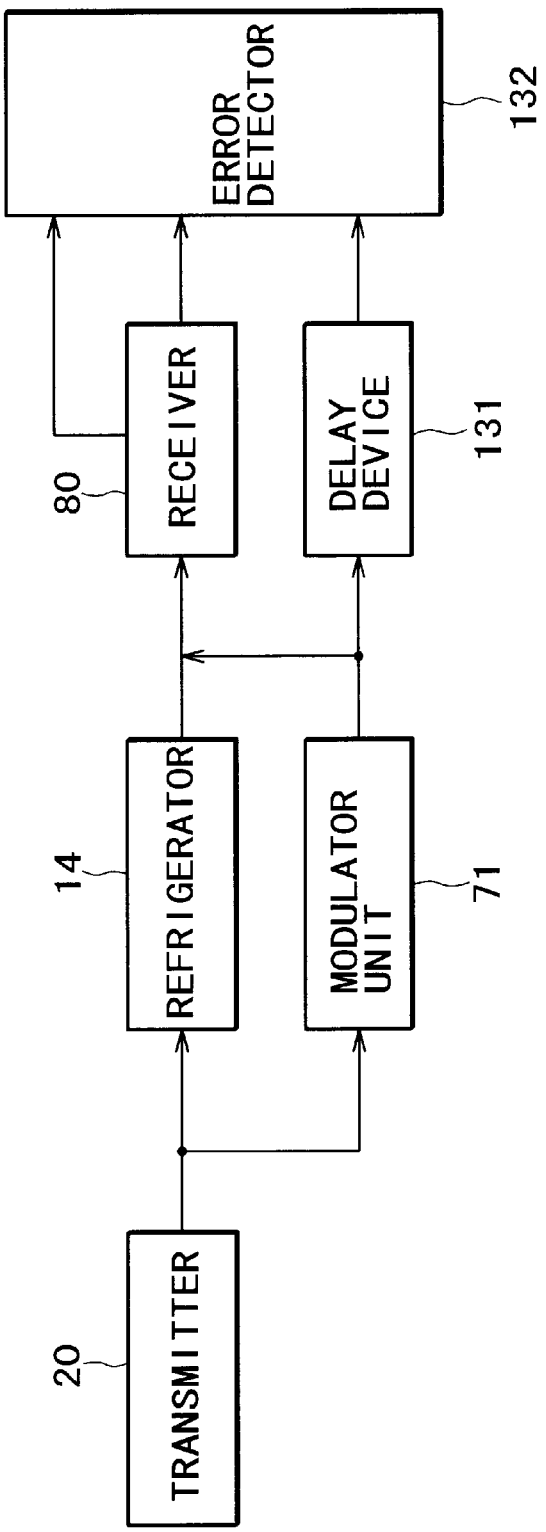

F I G. 2 7
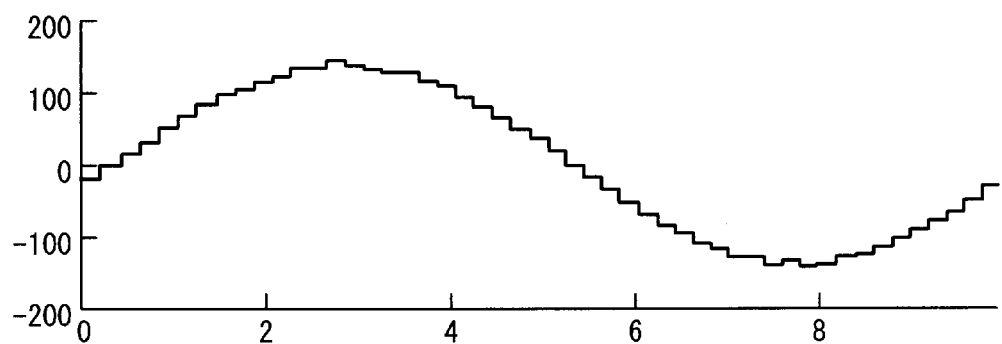
F I G. 2 8
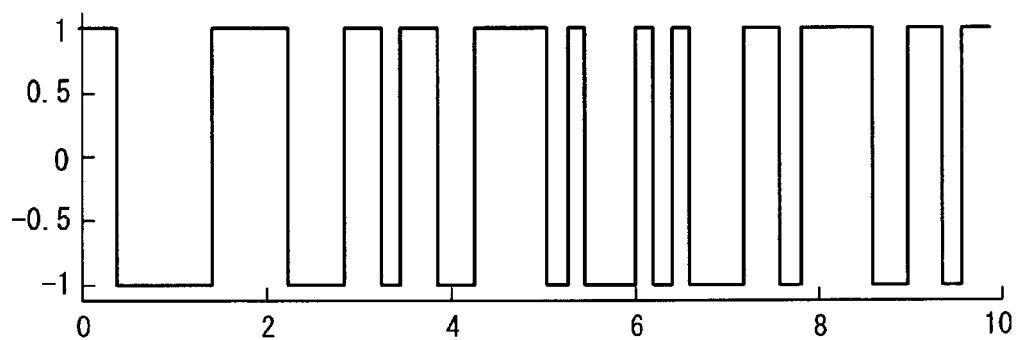

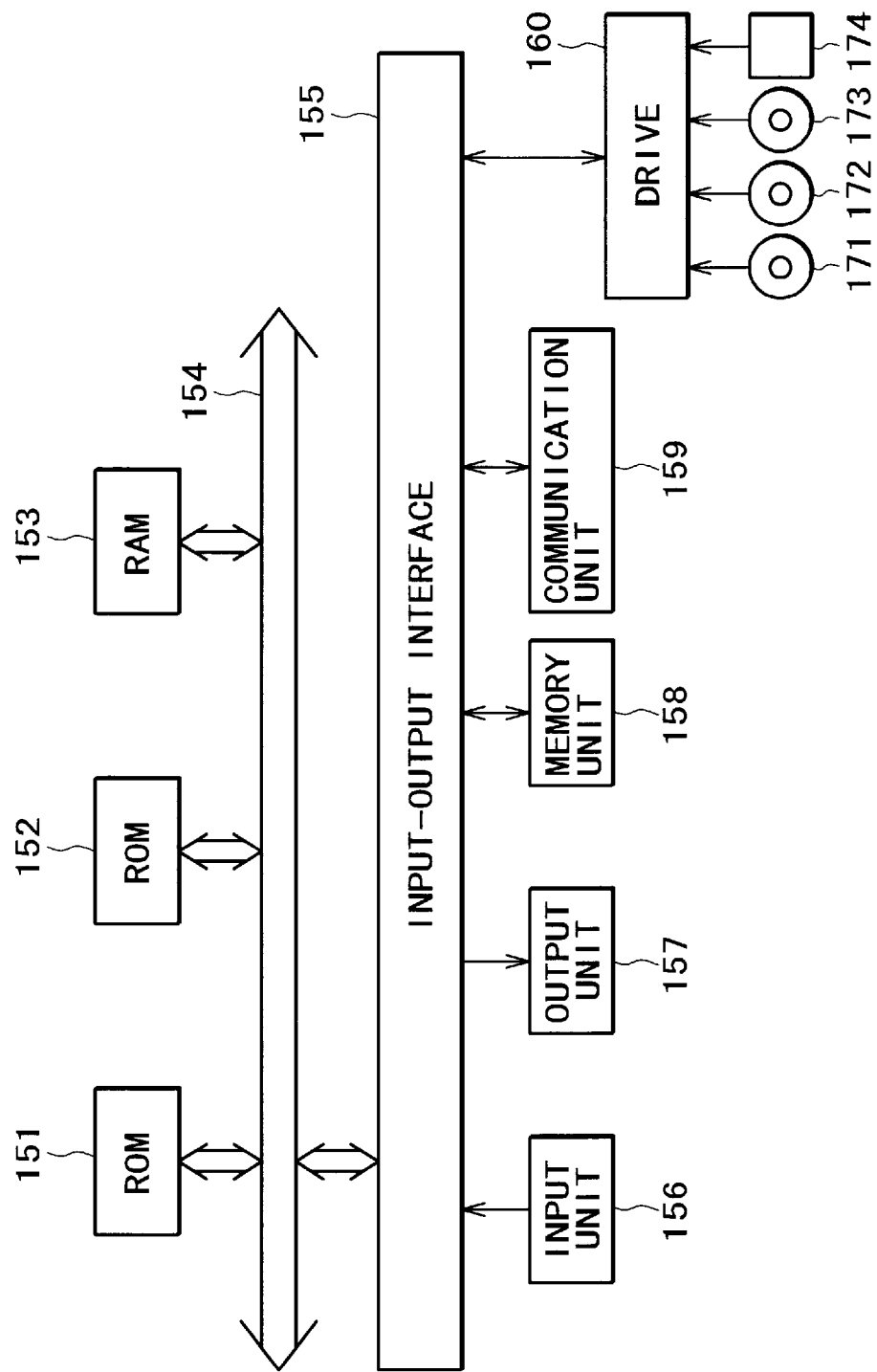

INFORMATION PROCESSING SYSTEM, INFORMATION PROCESSING APPARATUS AND METHOD, RECORDING MEDIUM, AND PROGRAM

BACKGROUND OF THE INVENTION

1. Field of the Invention

The present invention relates to an information processing system, an information processing apparatus and method, recording medium, and program, and more particularly, to an information processing system, an information processing apparatus and method, recording medium, and program which are useful to construct a network.

2. Description of Related Art

With the recent advance of network facilities, there has been proposed an idea that domestic electric appliances should also be organized into a network. Networked electric appliances would permit centralized control and data exchange among them. Moreover, it would be possible to control electric appliances from outside through a communication line connected to the domestic network.

Networking domestic electric appliances with wires is troublesome and poor in appearance. In order to solve this problem, there has been proposed an idea of using the power line to supply electric appliances with power as well as data.

The advantage of this idea is that the commercial power line (100V, 50 or 60 Hz) can transmit from outside spectrum spread modulation signals or OFDM (Orthogonal Frequency Division Mutliplex) modulation signals without affecting them.

The problem with networking with power lines is that signals with frequencies other than 50 or 60 Hz result in very low impedances, say, 1 ohm or lower (depending on the power-factor capacitor or power-supply filter) or LC oscillation with the inductance of the transformer because the power line is so designed as to transmit electric power most effectively at a frequency of 50 or 60 Hz.

In addition, the impedance becomes very high (say, 100 ohms or higher) in the absence of load. Because there is the possibility of impedance fluctuating considerably, stable communications need a dynamic range of 90 dB, a drive circuit which operates efficiently over a broad range of impedance, and a large power amplifier.

Change in impedance leads to change in load current flowing from electric appliances. The conventional way to cope with this situation is by correction which is accomplished as follows. First, ac load current is previously measured in the non-modulation period. Then, modulation signals (or signals carrying data) are sent. The present load current is estimated from the previously measured load current. The estimated load current is subtracted to make correction. The disadvantage of this method is that adequate estimate is impossible in the case where load current rapidly changes and hence the calculated load current may be erroneous.

SUMMARY OF THE INVENTION

The present invention was completed in view of the foregoing. It is an object of the present invention to provide a simple, safe domestic network for electric appliances in which data is sent by modulating the voltage or current signals of power supply and corrections are made in response to electric appliances varying in load.

The first aspect of the present invention is directed to an information processing system of the type having a first information processing apparatus to send data, a second information processing apparatus to receive and process said data, and a third information processing apparatus connected to said first information processing apparatus, wherein said first information processing apparatus contains a means to modulate current in response to data to be transmitted and a means to supply a first current which has been modulated by said modulating means to said second information processing apparatus; said second information processing apparatus contains a means to input a third current which has been synthesized from said first current supplied from said supply means and a second current output from said third information processing apparatus, a means to estimate said second current, a means to extract said first current by subtracting said second current (which has been estimated by said estimating means) from said third current which has been entered from said input means, and a means to demodulate said data from said first current extracted by said extracting means; and said third information processing apparatus contains a means to execute processing in response to instructions from said first information processing apparatus.

The second aspect of the present invention is directed to an information processing apparatus which comprises a means to input a third current which has been synthesized from a first current modulated in response to data and a second current output from another unit, a means to estimate said second current, a means to extract said first current by subtracting said second current (which has been estimated by said estimating means) from said third current which has been entered from said input means, and a means to demodulate said data from said first current extracted by said extracting means.

According to the third aspect, the information processing apparatus according to the second aspect is modified such that said estimating means samples the third current at a multiple of the frequencies of the power voltage applied to other apparatus and integrates the sampled values, thereby estimating the second current.

According to the fourth aspect, the information processing apparatus according to the third aspect is modified such that said estimating means performs sampling within a sampling time which is 50 times the frequency and processes the 50 sampled values in parallel.

According to the fifth aspect, the information processing apparatus according to the second aspect is modified such that said demodulating means judges the sign of the first current, thereby demodulating data.

The sixth aspect of the present invention is directed to an information processing method which comprises a step of controlling input of a third current which has been synthesized from a first current modulated in response to data and a second current output from other apparatus, a step of estimating said second current, a step of extracting said first current by subtracting said second current estimated in said estimating step from said third current whose input is controlled by processing in said input control step, and a step of demodulating said data from said first current extracted in said extracting step.

The seventh aspect of the present invention is directed to a recording medium storing a program that can be read by a computer, said program comprising a step of controlling input of a third current which has been synthesized from a first current modulated in response to data and a second current output from other apparatus, a step of estimating said second current, a step of extracting said first current by subtracting said second current estimated in said estimating step from said third current whose input is controlled by processing in said input control step, and a step of demodulating said data from said first current extracted in said extracting step.

The eighth aspect of the present invention is directed to a program to be executed by a computer, said program comprising a step of controlling input of a third current which has been synthesized from a first current modulated in response to data and a second current output from other apparatus, a step of estimating said second current, a step of extracting said first current by subtracting said second current estimated in said estimating step from said third current whose input is controlled by processing in said input control step, and a step of demodulating said data from said first current extracted in said extracting step.

In the information processing system according to the present invention, the first information processing apparatus modulates current in response to data to be transmitted and supplies the modulated first current to the second information processing apparatus, the second information processing apparatus inputs the third current which has been synthesized from the first current and the second current output from the third information processing apparatus, estimates the second current, extracts the first current by subtracting the estimated second current from the third current entered, and demodulates the data from the extracted first current, and the third information processing apparatus executes processing in response to instructions from the first information processing apparatus.

The information processing apparatus and method, and program according to the present invention are so designed as to enter the third current which has been synthesized from the first current modulated in response to data and the second current output from other apparatus is entered, estimate the second current, subtract the second current from the third current, extract the first current, and demodulate data from the extracted first current.

BRIEF DESCRIPTION OF THE DRAWINGS

FIG. 1 is a diagram showing the configuration of the information processing system according to one embodiment of the present invention.

FIG. 8 is a diagram showing an example of the configuration of the delay corrector 81.

FIG. 9 is a diagram showing an example of the configuration of the corrector 82.

FIG. 10 is a diagram showing an example of the configuration of the estimating unit 102.

FIG. 11 is a diagram showing an example of the configuration of the level lock loop 83.

FIG. 13 is a diagram illustrating a signal carrying data.

FIG. 14 is a diagram illustrating an example of the signal output from the ±1 data output unit 72.

FIG. 16 is a diagram illustrating an example of the signal output from the modulator unit 71.

FIG. 17 is a diagram illustrating an example of the signal input into the corrector 82.

FIG. 18 is a diagram illustrating an example of the signal output from the corrector 82.

FIG. 23 is a diagram illustrating an example of the signal output from the adder 121.

FIG. 24 is a diagram illustrating an example of the signal (from the multiplier 122) input into the adder 121.

FIG. 25 is a diagram showing an example of the configuration in which the error detector 132 is connected.

FIG. 27 is a diagram showing an example of the signal output from the delay corrector 81.

FIG. 28 is a diagram showing an example of the signal output from the receiver 80.

FIG. 31 is a diagram illustrating the recording medium.

DESCRIPTION OF THE PREFERRED EMBODIMENTS

Figure 2:
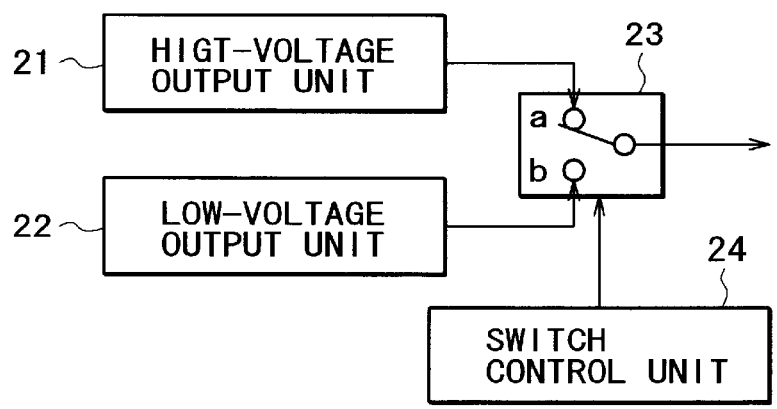
FIG. 2 is a diagram showing an example of the configuration of the transmitter 20.

The invention will be described below in more detail with reference to the accompanying drawings. FIG. 1 is a diagram showing the configuration of an example of the information processing system to which the present invention is applied. Electric power generated by a power plant is transmitted to the transformer 2 through the distribution line 1. The transformer reduces the voltage to 100 or 200 V suitable for domestic use.

The source voltage, which has been reduced by the transformer 2, is supplied to each residence through the incoming line 3. The source voltage supplied to each residence enters the distribution board 11 usually through a meter etc., which are omitted here for convenience of description.

The distribution board 11 consists of an ampere breaker, leakage breaker, and distribution breaker (which are not shown) and distributes the source voltage to lamps and wall outlets in each room of the residence. Here, it is assumed that the source voltage from the distribution board 11 is supplied to outlets 12-1 to 12-N. To the out-lets 12-1 and 12-2 are connected respectively the modems 13-1 and 13-2.

In addition, to the modems 13-1 and 13-2 are connected respectively the refrigerator 14 and the television receiver 15. In the diagram, the modem 13-1 is depicted as being separate from the refrigerator 14 and the modem 13-2 is depicted as being separate from the television receiver 15; however, another arrangement is also possible in which the modem 13-1 is built into the refrigerator 14.

In the following description, the outlets 12-1 to 12-N are simply referred to as outlet 12-1 if it is not necessary to discriminate them. This applies also to other appliances. Moreover, for the sake of convenience, the following description treats the refrigerator 14 and the television receiver 15 as electric appliances. Any other electric appliance may be connected to the modem 13.

Figure 3:
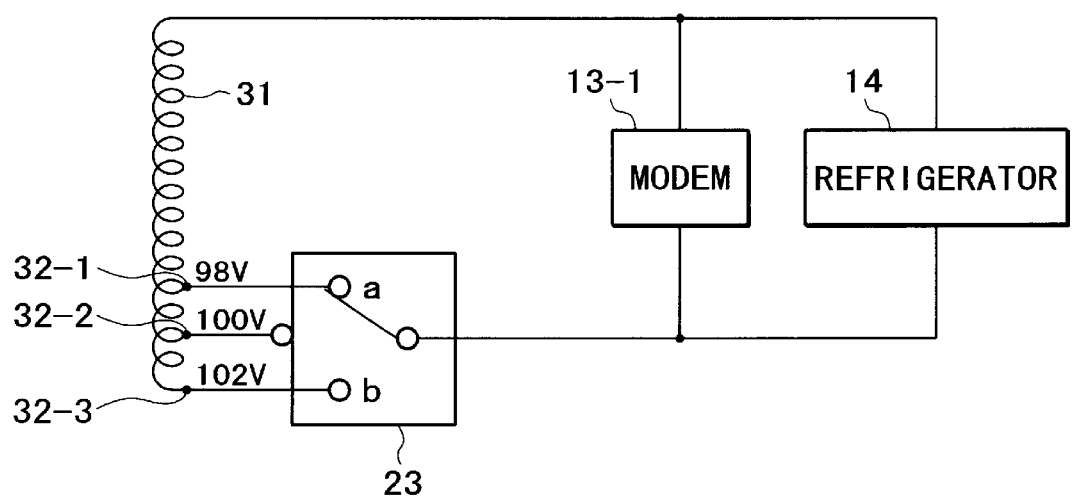
FIG. 3 is a diagram showing another example of the configuration of the transmitter 20.

This embodiment is designed such that the electric appliances connected to the modems 13 are controlled by the data which is supplied together with the source voltage. This data is transmitted by the transmitter 20 constructed as shown in FIG. 3. The transmitter 20 may be installed in the distribution board 11 in a single residence so that it controls electric appliances in the residence.

Alternatively, the transmitter 20 may be installed between the transformer 2 and the distribution board 11 in an apartment house so that it collectively controls the electric appliances in each residence in the apartment house. In other words, the transmitter 20 should be installed in an adequate place so that it controls a desired range of electric appliances.

The transmitter 20 consists of a high-voltage output unit 21, a low-voltage output unit 22, a switch 23, and a switch control unit 24. The source voltage supplied to each residence is usually an ac signal with an effective value of 100 V. In this embodiment, it is assumed that the voltage represents the effective value (unless otherwise indicate) and the source voltage supplied to each residence is 100 V.

The high-voltage output unit 21 produces ac signals with 102 V as against 100 V, and the low-voltage output unit 22 produces ac signals with 98 V as against 100 V. The ac voltage signals produced by the high-voltage output unit 21 and the low-voltage output unit 22 are ac signals of 50 or 60 Hz synchronous with the source voltage (or 100-V signals) supplied to each residence.

Incidentally, the voltage (effective voltage) of the ac signals mentioned above is not necessarily limited to 102 V and 98 V; however, it may have any voltage value. It should be so established as to produce no adverse effect on electric appliances (within a range from 95 to 105 V or within ±5% of the source voltage).

The ac signals produced by the high-voltage output unit 21 enter the terminal a of the switch 23, and the ac signals produced by the low-voltage output unit 22 enter the terminal b of the switch 23. Connection to the terminal a or b is changed by the switch control unit 24. The switch control unit 24 generates data by the aid of a CPU or central processing unit (not shown) and, by operating the switch 23, sends data to electric appliances connected through the modem 13.

The data to be sent to electric appliances is binary data in which 1 represents the ac signals at 102 V generated by the high-voltage output unit 21 and 0 represents the ac signals at 98 V generated by the low-voltage output unit 22.

In the case where the transmitter 20 is built into the transformer 2 (shown in FIG. 1), the ac signals of 98 V and 102 V may be obtained from taps connected to the secondary coil of the transformer 2.

FIG. 3 is a simplified diagram showing how to obtain ac signals from taps. The secondary coil 31 has three taps 32-1 to 32-3. The first tap 32-1 for ac signals of 98 V is positioned some turns away from the end of the coil. The second tap 32-2 for ac signals of 100 V is positioned close to the end of the coil. The third tap 32-3 for ac signals of 102 V is positioned at the end of the coil.

The ac signals from the tap 32-1 enter the terminal a of the switch 23, and the ac signals from the tap 32-2 enters the tap b of the switch 23. Then these signals enter the modem 13-1 and the refrigerator 14.

Figure 4:
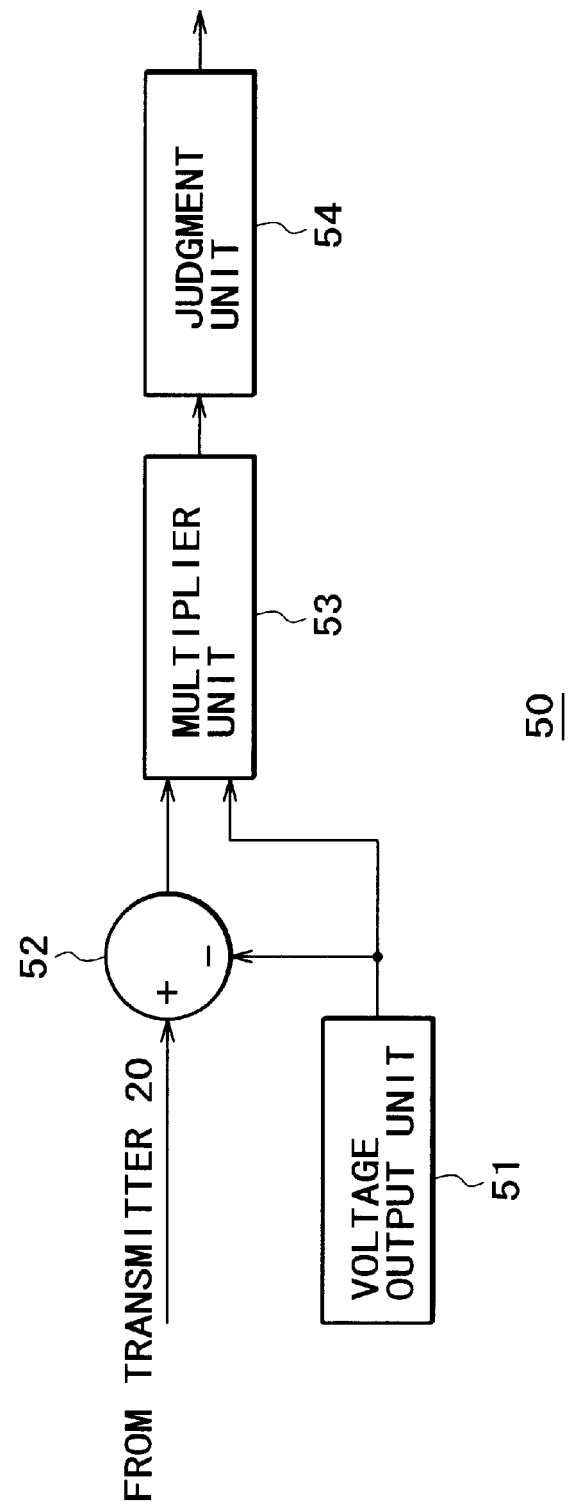
FIG. 4 is a diagram showing an example of the configuration of the demodulator unit 50.

The modem 13-1 has a demodulator 50 to demodulate the signals from the transmitter 20. As shown in FIG. 4, the demodulator 50 consists of a voltage output unit 51, an adder unit 52, a multiplier unit 53, and a judgment unit 54. The voltage output unit 51 gives the adder 52 ac signals of 100 V (the same voltage as the source voltage supplied to electric appliances). Provision may be made such that these ac signals are supplied from the distribution board 11 separately from the modulation signals from the transmitter 20 or these ac signals are generated by the voltage output unit 51.

Another way to generate the ac signals of 100 V is by synchronizing their phase with that of the modulation signals from the transmitter 20 with the aid of PLL (phase-Locked Loop) and averaging the voltage of the modulation signals from the transmitter 20 (so that the average of 98 V and 102 V is 100 V).

The adder 52 receives the modulation signals carrying data from the transmitter 20. In the adder 52, the ac signal of 100 V from the voltage output unit 51 is subtracted from the modulation signal from the transmitter 20. The multiplier 53 receives the output from the adder 52, and it also receives the output from the voltage output unit 51. The multiplier 53 functions to synchronize the modulation signal from the adder 52 with the regenerating carrier.

The output from the multiplier 53 enters the judgment unit 54, which judges the sign of the modulation signal (the output from the multiplier 53) it has received. If the sign is plus, the data received is judged to be 1. If the sign is minus, the data received is judged to be 0. Judgment in this manner permits the demodulation of binary data from the transmitter 20.

The demodulated data produced by the demodulator 50 actuates electric appliances connected to the modem 13 including the demodulator 50. For example, it causes the television receiver 15 to display emergency information in an emergency.

As mentioned above, the provision according to the present invention so works as to transmit signals together with the source voltage supplied to electric appliances to be controlled and to demodulate the thus transmitted data. This signal transmission and demodulation are accomplished by using two terminals for different voltages, one terminal corresponding to data 0 and the other terminal corresponding to data 1. Signal modulation is accomplished by shifting the connections of the two terminals by mean of high frequencies. The modulated signal is demodulated at the receiving side. In this way it is possible to construct a network to control electric appliances more safely (without damage) than injecting electric power by means of an active element.

Figure 5:
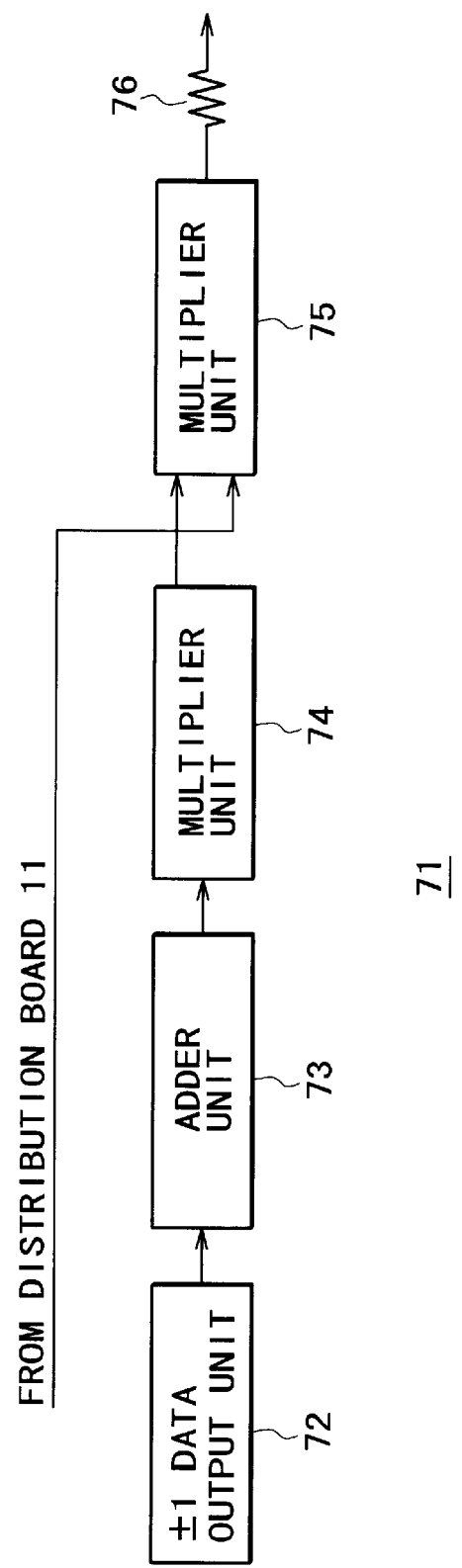
FIG. 5 is a diagram showing an example of the configuration of the modulator unit 71.

The following deals with transmission of data from electric appliances. For transmission of data from electric appliances, the modem 13 is incorporated with the modulator unit 71 as shown in FIG. 5. The modulator unit 71 consists of a ±1 data output unit 72, an adder unit 73, multiplier units 74 and 75, and a resistor 76.

The ±1 data output unit 72 generates −1, if the data to be transmitted is 0, and 1, if the data to be transmitted is 1, in response to instructions from an apparatus (not shown) to generate data to be transmitted. The unit of −1 or 1 may be volt. In other words, the ±1 data output unit 72 sends a signal of +1 volt or −1 volt to the adder unit 73 in response to data to be transmitted.

The adder unit 73 adds 1 volt to the signal which has been entered. As the result of this processing, the adder unit 73 sends a signal of 0 volt or 2 volts to the multiplier unit 74. The multiplier unit 74 multiplies the input signal by 0.5. The consequence is that the first multiplier unit 74 sends a signal of 0 volt or 1 volt to the second multiplier unit 75.

The second multiplier unit 75 also receives the ac signal of 100 V from the distribution board 11, which is normally supplied to electric appliances. The second multiplier unit 75 multiplies the ac signal by 0 or 1 in response to the signal (0 volt or 1 volt) from the first multiplier unit 74. If the ac signal is multiplied by 0, then the multiplier unit 75 generates no voltage (0 volt) at all times. If the ac signal is multiplied by 1, then the multiplier unit 75 generates the voltage of the ac signal received. In other words, those units from 72 to 75 function as switches to turn on and off the ac signals.

Figure 7:
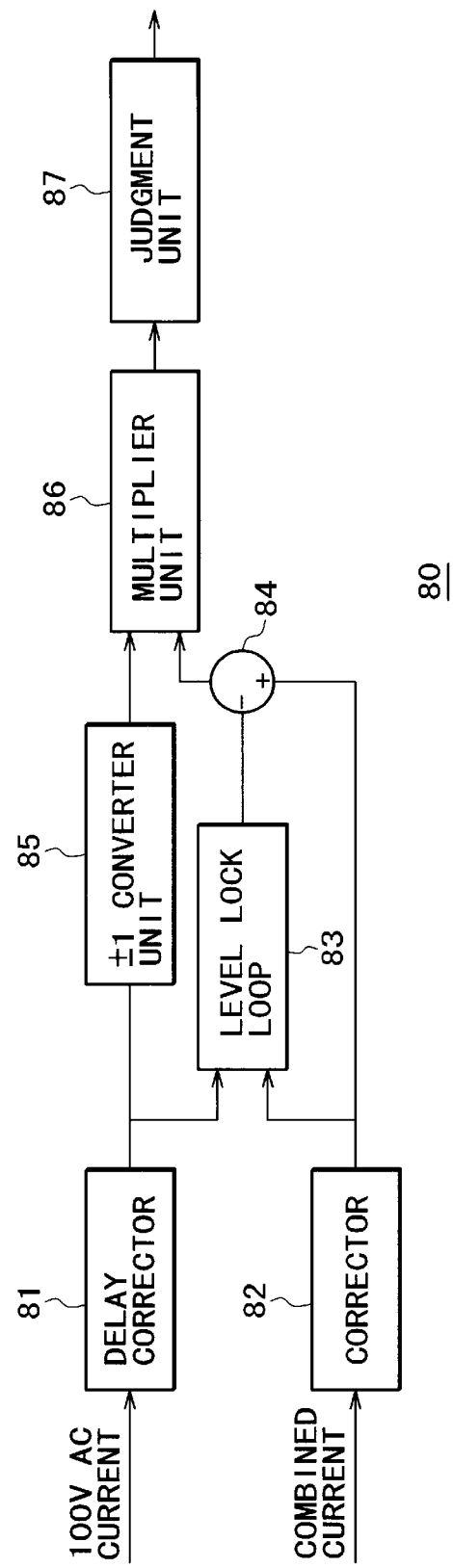
FIG. 7 is a diagram showing an example of the configuration of the receiver 80.

The output from the multiplier unit 75 passes through the resistor 76 and reaches the receiver 80 as shown in FIG. 7. The current passing through the resistor 76 is modulated by the modulator unit 71. (This current is referred to as modulation current hereinafter.) The modulator unit 71 is incorporated into the modem 13 as shown in FIG. 3, and the modem 13 is connected in parallel to an electric appliance (a refrigerator in the case of FIG. 3).

Figure 6:
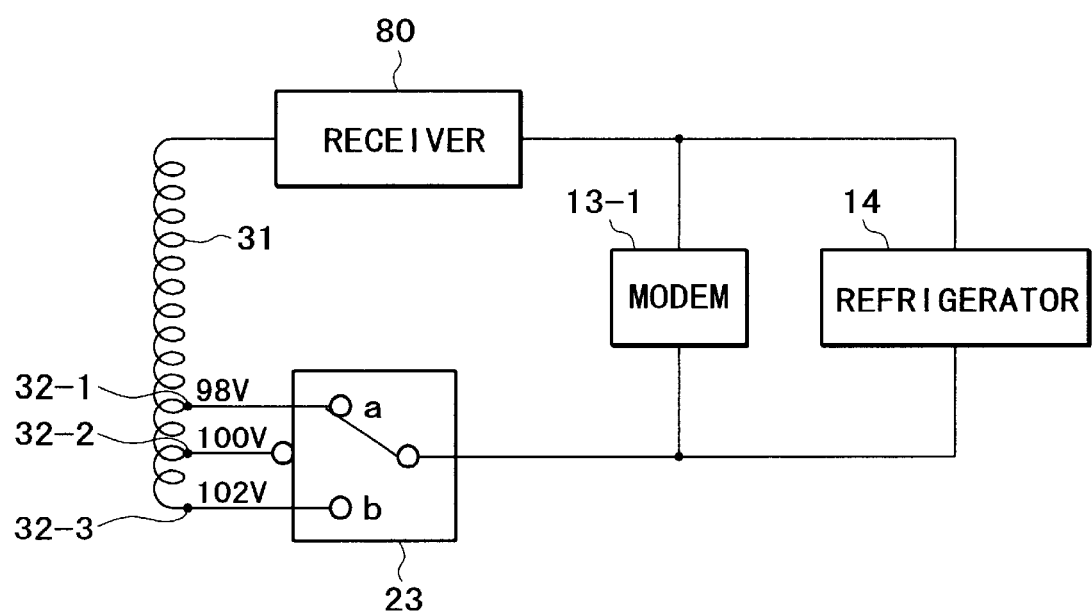
FIG. 6 is a diagram illustrating an example of the connection of the receiver 80.

The receiver 80 connected in the position shown in FIG. 6 receives a current which has been synthesized from the current modulated by the modem 13-1 and the current flowing through the refrigerator 14. (The latter current will be referred to as load current hereinafter.) Thus, the synthesized current is composed of load current and modulator current. Since the load current is constant (or the refrigerator has a constant load), the synthesized current depends on the ac voltage applied to the refrigerator 14 unless the modulation current is added.

It is easy to obtain the magnitude of the load current, which depends on ac voltage; therefore, it is easy to calculate the magnitude of the modulation current by subtracting the load current from the synthesized current. Thus, it is possible to extract data which has been modulated by the modulator unit 71. When the modulation current is calculated, it is necessary to take into account the fact that the load current varies from one electric appliance to another.

The modulated data from the modulator unit 71 is received and demodulated by the receiver which is explained below. The receiver 80 is configured as shown in FIG. 7. It receives the synthesized current composed of the modulation current and load current mentioned above. The load current depends on the load of the electric appliance.

An electric appliance may be regarded as having loads corresponding to resistors, capacitors, coils, diodes, etc. (or load due to full-wave rectification circuit, load due to full-wave rectification circuit with a smoothing capacitor, and load due to full-wave rectification circuit with a choke coil). The load of each function varies from one electric appliance to another. Thus, it is necessary to calculate the load current by assuming the load of the corresponding function. The receiver 80 shown in FIG. 7 is so configured as to process the modulation current and extract data on the assumption that loads vary depending on functions.

The receiver 80 shown in FIG. 7 consists of a delay corrector 81, a corrector 82, a level lock loop 83, an adder unit 84, a ±1 converter unit 85, a multiplier unit 86, and a judgment unit 87. The delay corrector 81 receives the ac voltage of 100 V, delays it for a prescribed period of time, and then supplies it to the level lock loop 83 and the ±1 converter unit 85. The corrector 82 receives the synthesized current composed of the load current from the electric appliance and the modulation current from the modulator unit 71, and it processes the received current in consideration of the load corresponding to the electric appliance which generates the load current. (A detailed description will be given later.) The result of processing is sent to the level lock loop 83 and the adder unit 84.

The level lock loop 83 estimates the current value. The adder unit 84 subtracts the current value estimated by the level lock group 83 from the current value which has been corrected by the corrector 82, and it sends the thus obtained modulation current to the multiplier 86. The multiplier 86 converts, by using the signal from the ±1 converter unit 85, the modulation current from the adder unit 84 into the signal whose sign can be judged by the judgment unit 87 placed downstream. Judgment by the judgment unit 87 permits modulated data to be extracted.

The judgment unit 87 generates a voltage of +1 V if the data is judged to be 1 and generates a voltage of −1 V if the data is judged to be 0. In addition, the judgment unit 87 judges the data to be 1 or 0, respectively, depending on whether the signal from the multiplier unit 86 is plus or minus.

The output (data) from the judgment unit 87 undergoes prescribed processing by a CPU etc. (not shown). For example, the receiver 80 receives data representing the content of the refrigerator 14 from the modem 13-1 connected to the refrigerator 14. Then, the receiver 80 sends an instruction to the transmitter 20, thereby causing the transmitter 20 to send the received data to the modem 13-2 connected to the television receiver 15. Upon processing by the modem 13-2, information as to the content of the refrigerator 14 is displayed on the television receiver 15.

As mentioned above, the provision according to the present invention works such that the electric appliance causes the modulator unit 71 to modulate current, thereby transmitting data, and this data is demodulated by the receiver 80. In this way it is possible to set up a network to control electric appliances more safely (without damage) than injecting electric power by means of an active element.

The delay corrector 81 is configured as shown in FIG. 8. It consists of a buffer unit 91 and an input/output control unit 92 which controls the input/output of the data from the buffer unit 91. The buffer unit 91 is supplied with ac voltage (100 V). It samples the ac voltage supplied at a sampling frequency which is 50 times the frequency of the ac voltage. The sampled values are sequentially buffered.

The input/output control unit 92 controls the input/output of the data from the buffer unit 91 such that there is delay time (e.g., 11×Ts, where Ts stands for the sampling frequency) as in the case of the corrector 82.

The corrector 82 is configured as shown in FIG. 9. It consists of a buffer unit 101, an estimating unit 102, an output buffer 103, and an input/output control unit 104. The input buffer 101 receives and temporarily stores the synthesized current as an input. The input/output control unit 104 performs sampling at a sampling frequency which is, say, 50 times the frequency (50 or 60 Hz) of the ac voltage (100 V) supplied to the electrical appliance. It performs control such that the sampled current value enters the input buffer unit 101.

Incidentally, the sample frequency is not specifically restricted. It is assumed that the sampling frequency herein is 50 times.

The input 101 buffer stores 50 sampled values and sends them in parallel to the estimating unit 102. The estimating unit 102 is configured as shown in FIG. 10. It consists of adder units 111 and 112 and delay units 113 and 114.

The estimating unit 102 receives in parallel 50 sampled values which are processed as a unit (referred to as 50-dimensional current hereinafter for the sake of convenience). The 50-dimensional current from the input buffer 101 first enters the adder unit 111. The 50-dimensional current from the delay unit 114 also enters the adder unit 111. The adder unit 111 subtracts the 50-dimensional current (entered from the delay unit 114) from the 50-dimensional current from the input buffer 101.

This subtraction is performed on 50 sampled values such that the sampled values of the delay unit 114 corresponding to the sampled values from the input buffer 101 are subtracted respectively. The 50-dimensional current from the adder unit 111 is supplied to the adder unit 112 and the output buffer 103. It is the result of estimate from the estimating unit 102 that is supplied to the output buffer 103.

A resistor may be placed between the adder unit 111 and the adder unit 112 according to need. The adder unit 112 and the delay unit 113 constitute an integrator. In other words, the estimating unit 102 contains one integrator and estimates the load current from the primary loop for each phase obtained by dividing one cycle into 50 sections. By estimating the load current in this manner, it is possible to minimize the effect of a sudden change in load current and to perform accurate demodulation on the modulated data in the subsequent processing.

The estimated 50-dimensional current enters the delay unit 114 and, after prescribed delay, enters the adder unit 111. The adder unit 111 subtracts the 50-dimensional current (as the estimated load current from the delay unit 114) from the 50-dimensional current (synthesized current) from the input buffer 101, thereby calculating and outputting the value of the modulation current. The modulation current thus output enters the adder unit 112 and the output buffer 103 as mentioned above.

The modulation current which has entered the output buffer 103 is then sent out to the level lock loop 83 and the adder unit 84 (FIG. 7) in series in the order of phase under the control of the input/output control unit 104. The level lock loop 83 is configured as shown in FIG. 11. It consists of adder units 121 and 126, multiplier units 122 and 123, and delay units 124 and 125.

The modulation current supplied to the level lock loop 83 is in phase with voltage as electrical resistance load. Consequently, the current signal can be synchronized simply by matching the current value or the level. Thus, the level lock loop 83 estimates the level by means of the primary loop.

The modulation current from the corrector 82 enters the adder unit 121. The adder unit 121 subtracts the current entered from the multiplier unit 122 from the modulation current entered from the corrector 82, and supplies the result to the multiplier unit 123. The multiplier units 122 and 123 are intended for synchronization. The modulation current from the multiplier unit 123 enters the adder unit 126. The adder unit 126 adds the modulation current entered to the delayed modulation current from the delay unit 125, and sends the result to the delay unit 124.

The level lock group 83 (constructed as mentioned above) performs processing in its constituents, thereby estimating the modulation carrier current (level), and sends the result to the adder unit 84 (FIG. 7). The adder unit 84 subtracts the modulation carrier current supplied from the level lock loop 83 from the modulation current supplied from the corrector 82, thereby extracting only the modulation current.

The output from the adder unit 84 enters the multiplier unit 86. The signal from the ±1 converter unit 85 also enters the multiplier unit 86. The ±1 converter unit 85 outputs signals of +1 or −1 which are generated according to the source voltage from the delay corrector 81. The multiplier unit 86 multiplies the signal from the ±1 converter unit 85 by the modulation current from the adder unit 84.

The multiplied signal enters the judgment unit 87, which judges the sign of the signal received, thereby demodulating the data received.

Estimating and removing the load current as mentioned above make it possible to accurately demodulate the modulated data at the receiving side without being affected by changing load.

Incidentally, there are no specific restrictions on the demodulation system.

Figure 12:
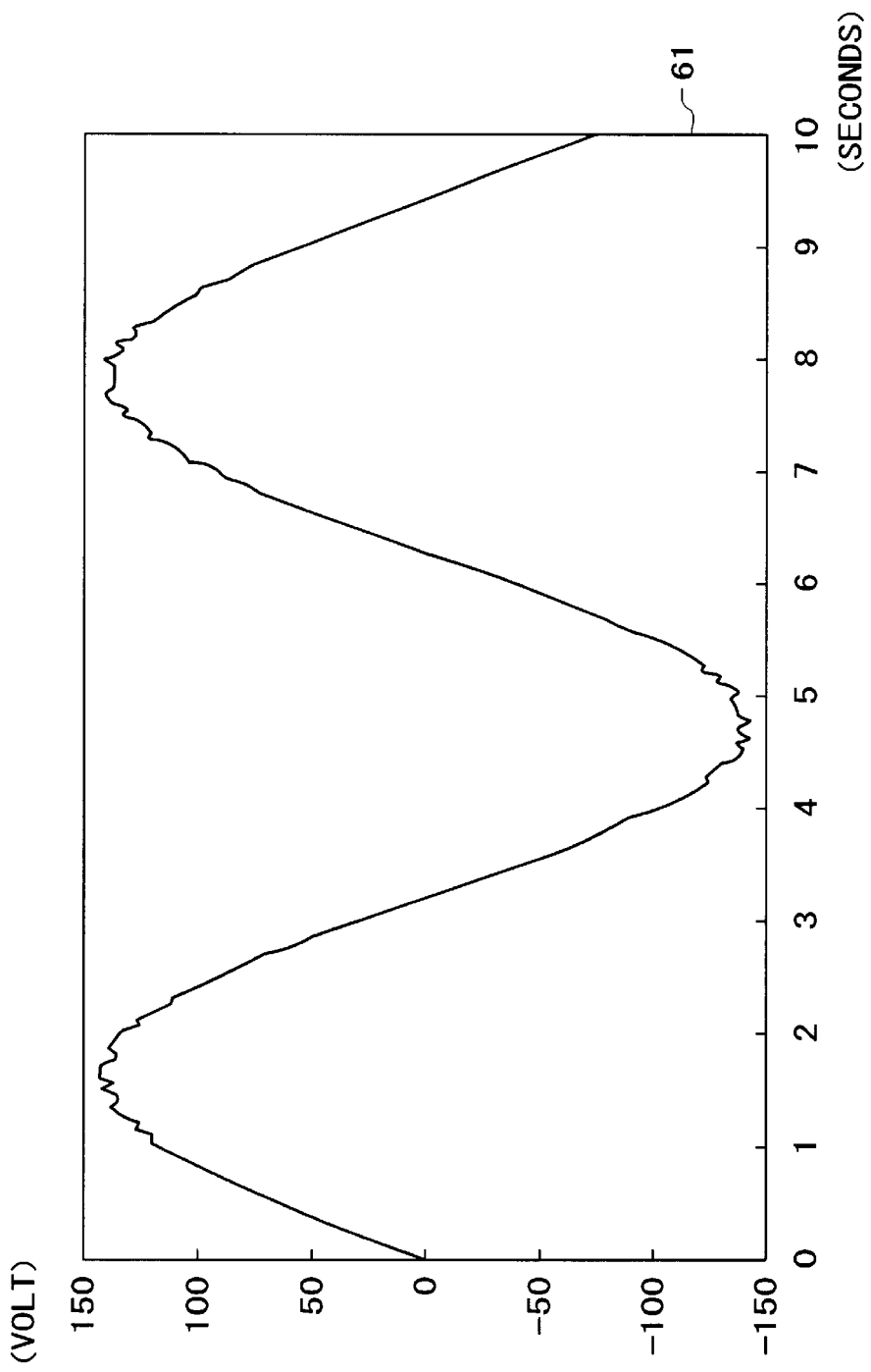
FIG. 12 is a diagram showing an example of the signal transmitted from the transmitter 20.

The following deals with the signals which are actually transmitted by the data transmitter 20, demodulated by the demodulator unit 50, modulated by the modulator unit 71, and received by the receiver 80. The waveform of the signal shown in the following is a mere example but is not intended for restriction. FIG. 12 is a waveform of the signal from the transmitter 20 shown in FIG. 2. (It is a copy from the display 61 of an oscilloscope that permits the observation of waveform.) What is shown in FIG. 12 is the signal which was obtained from the switch 23.

The jaggy peaks and troughs indicate that data is carried by them, and the smooth parts indicate the absence of data. A further explanation will be made with reference to FIG. 13. In this embodiment, the electric appliance is supplied with not only the ac signal of 100 V (which is the source voltage) but also the ac signal of 102 V (which is generated by the high-voltage output unit 21) and the ac signal of 98 V (which is generated by the low-voltage output unit 22).

The ac signals of 102 V and 98 V are generated as the switch 23 is shifted according to the data supplied to the electric appliance. As the switch 23 is shifted, the ac signals of 102 V or 98 V appear in place of the ac signal of 100 V as shown with a thick line in FIG. 13. These signals are represented by the jaggy lines in FIG. 13.

The ac signals supplied to the electric appliance (such as refrigerator 14 and television receiver 15) has the waveform as shown in FIG. 12 which is obtained by measuring the voltage applied to the electric appliance. In other words, the ac signal supplied to the electric appliance and the ac signal generated by the transmitter 20 have the same waveform.

Figure 15:
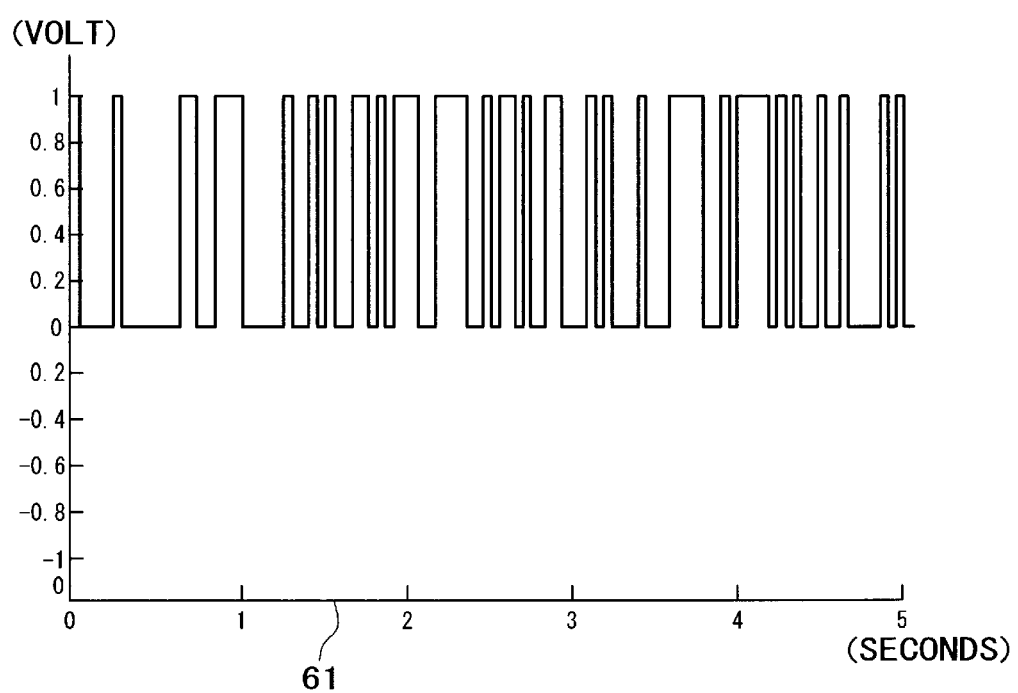
FIG. 15 is a diagram illustrating an example of the signal output from the multiplier unit 74.

The following deals with the signals in the modulator unit 71 shown in FIG. 5. FIG. 14 shows the waveform of the signal generated by the ±1 data output unit 72. It is to be noted that +1 volt and −1 volt are generated alternately according to the data transmitted. FIG. 15 shows the waveform of the signal generated by the multiplier unit 74 in the modulator unit 71. It is to be noted that the data from the multiplier unit 74 is converted into signals of 0 volt or 1 volt.

FIG. 16 shows the waveform of the signal generated by the modulator unit 71. For data 1, the output current has any value other than 0 ampere (which depends on the ac voltage applied at a particular time). For data 0, the output current has a value of 0 ampere. The output from the modulator unit 71 is non-zero ampere or zero ampere, and the modulator unit 71 may be regarded as a switch to turn on and off current as mentioned above. Therefore, it is possible to construct the modulator unit 71 from a switch and a resistor.

The following deals with the signal to be processed by the receiver 80. The corrector 82 of the receiver 80 (shown in FIG. 7) receives the synthesized current as shown in FIG. 17. The output from the corrector 82 is a signal as shown in FIG. 18.

Figure 19:
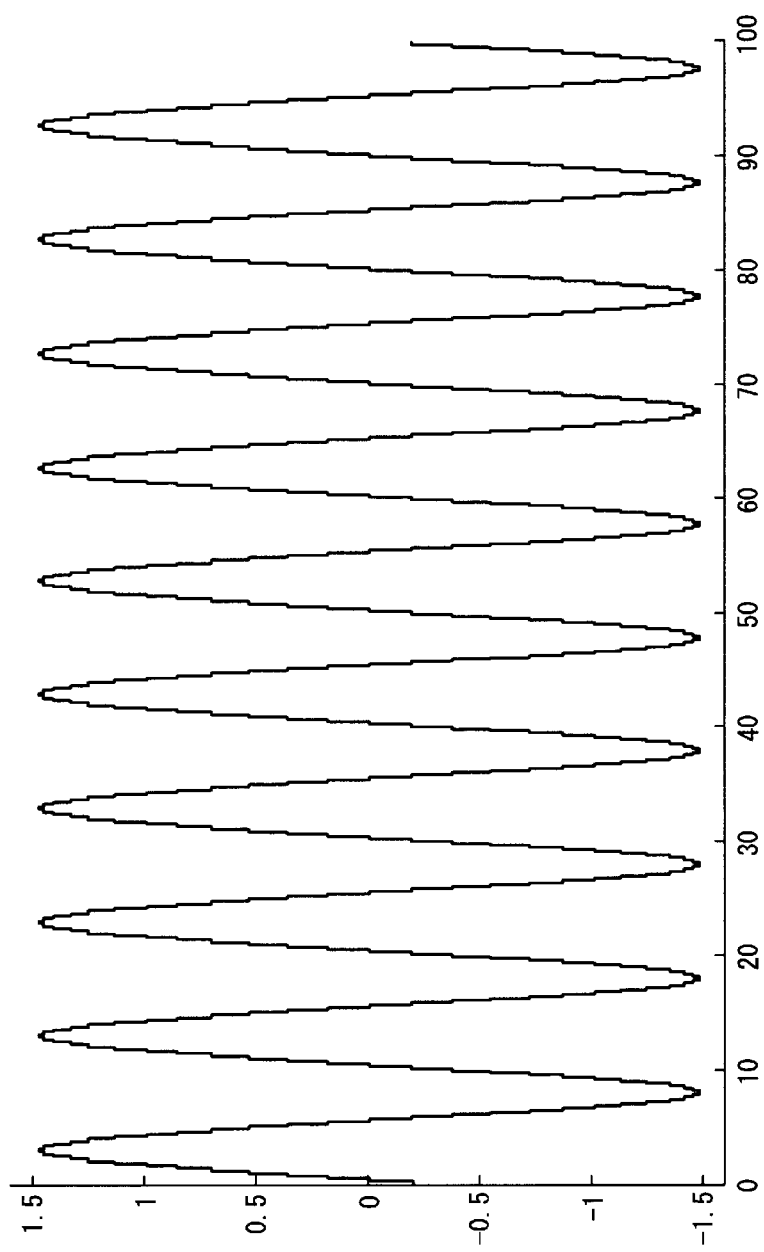
FIG. 19 is a diagram illustrating an example of the signal output from the delay unit 114.

FIG. 19 shows the signal which is produced when the signals from the delay unit 114 of the estimating unit 102 of the corrector 80 (FIG. 10) are sequentially entered in series. In FIG. 19, 50 sampled values appear continuously.

Figure 20:
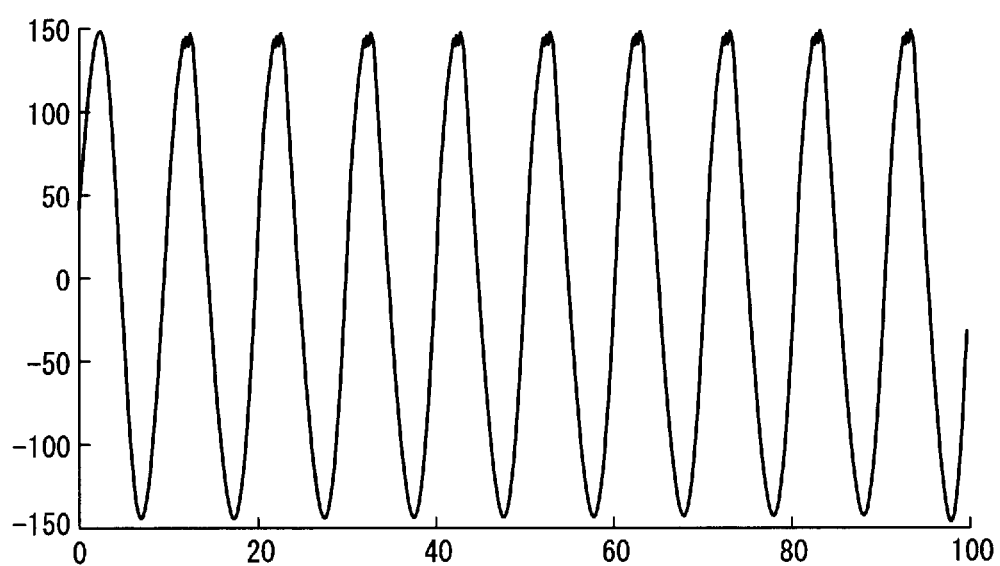
FIG. 20 is a diagram illustrating an example of the signal input into the delay corrector 81.
Figure 21:
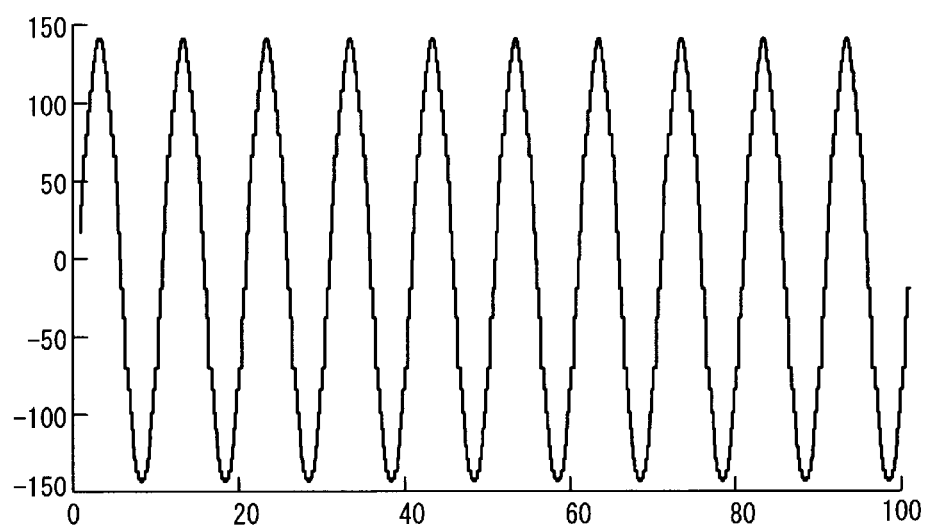
FIG. 21 is a diagram illustrating an example of the signal output from the delay corrector 81.

FIG. 20 shows the signal of the source voltage (100 V) given to the delay corrector 81. Upon processing on this signal by the delay corrector 81, there is obtained the signal as shown in FIG. 21. The signal shown in FIG. 21 continuously represents 50 sampled values obtained from the signal shown in FIG. 20.

Figure 22:
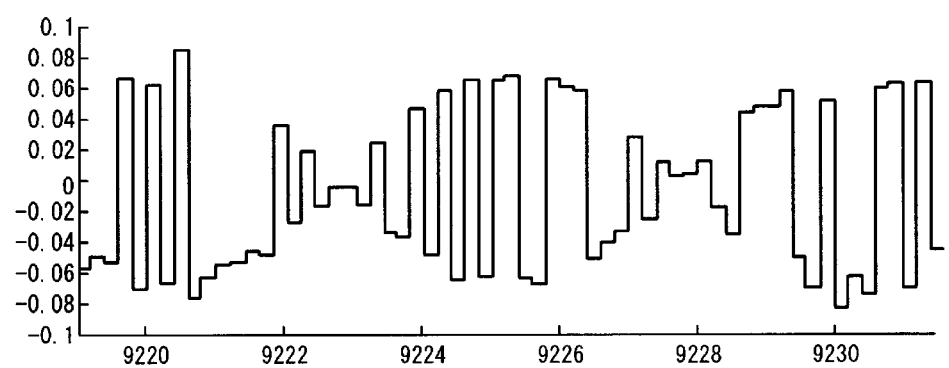
FIG. 22 is a diagram illustrating an example of the signal (from the corrector 82) input into the adder 121.

FIGS. 22 to 24 show the signals which are handled by the level lock loop 83 of the receiver 80 (FIGS. 7 and 11). FIG. 22 shows the signal from the corrector 92 to be input to the adder 121 (signal to be input to the level lock loop 83). FIG. 23 shows the signal from the adder 121. FIG. 24 shows the signal from the multiplier 122 (the signal from the level lock loop 83).

FIG. 25 shows a configuration in which the error detector 132 is connected. The error detector 132 receives the signals from the modulator unit 71 and the receiver 80 in order to compare the modulated data with the received data. Incidentally, in the configuration shown in FIG. 25, the delay device 131 delays the signal from the modulator unit 71 and synchronizes the delayed signal with the signal from the receiver 80.

The delay device 131 is constructed in the same way as the delay corrector 81 shown in FIG. 8, and hence its explanation is omitted. The delay corrector 81 shown in FIG. 8 processes the voltage value, while the delay device 131 processes the current value.

Figure 26A:
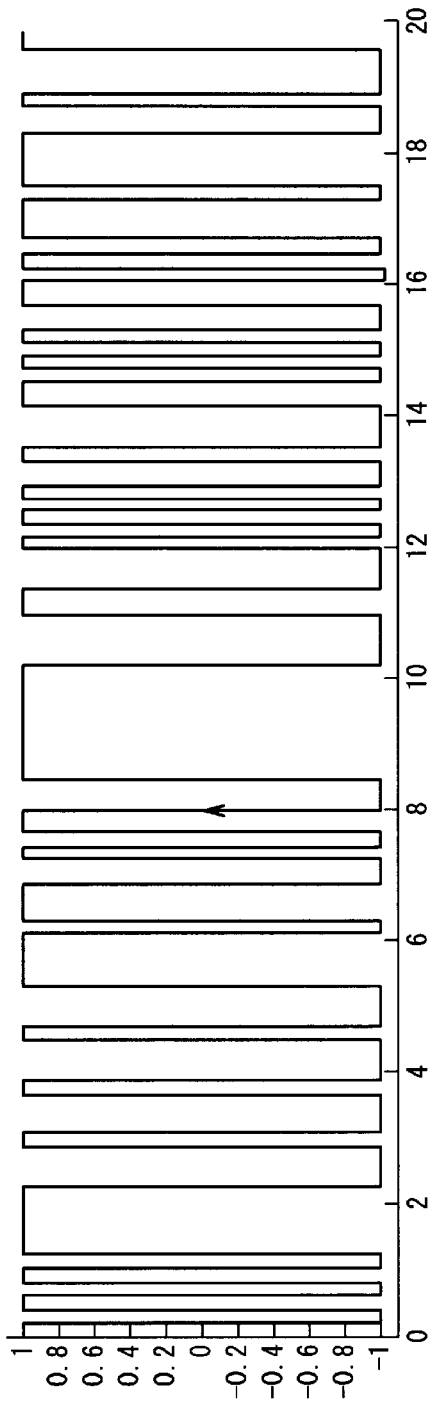
FIGS. 26A–26B is a diagram showing an example of the signals input into and output from the delay device 131.
Figure 26B:
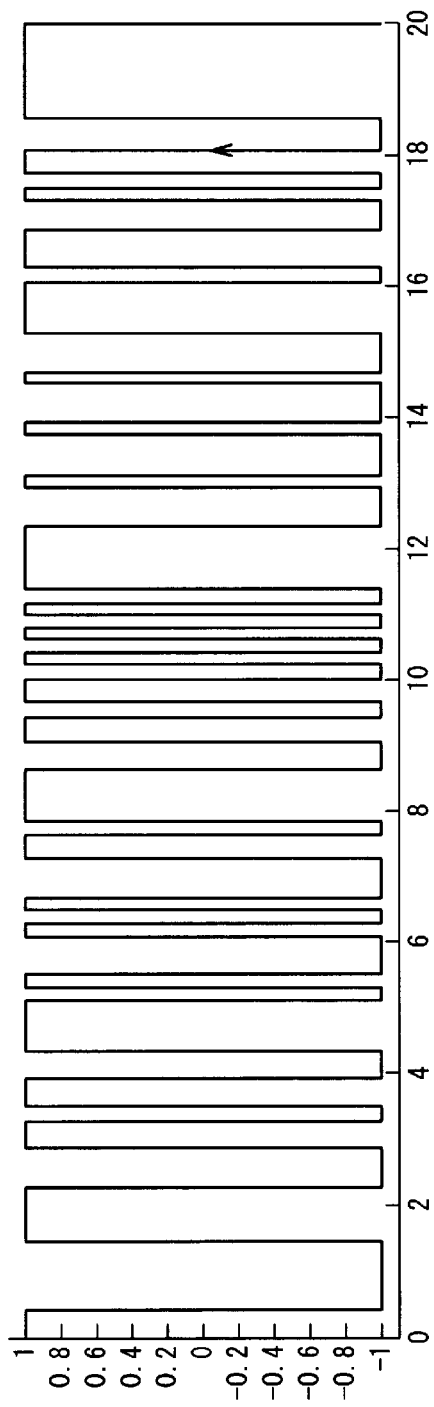

FIG. 26 shows the signals into and from the delay device 131. FIG. 26(A) shows the signal to be entered into the delay device 131. FIG. 26(B) shows the output signal which is delayed as much as 11×Ts from the input signal. Arrows in FIG. 26 indicate the delay (11×Ts) of the signal.

Figure 29:
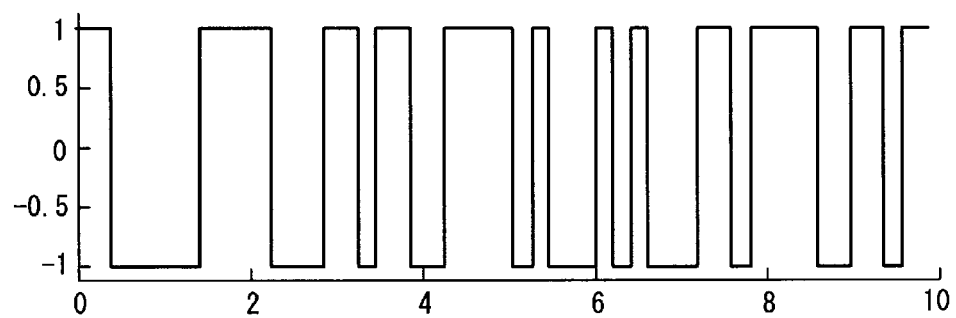
FIG. 29 is a diagram showing an example of the signal output from the modulator unit 71.

FIG. 27 shows the signal which was input to the error detector 132 (FIG. 25) and output from the delay corrector 81 (FIG. 7). FIG. 28 shows the signal which was output from the receiver 80. FIG. 29 shows the signal which was output from the modulator unit 71 through the delay device 131. These signals are in synchronism with each other.

Figure 30:
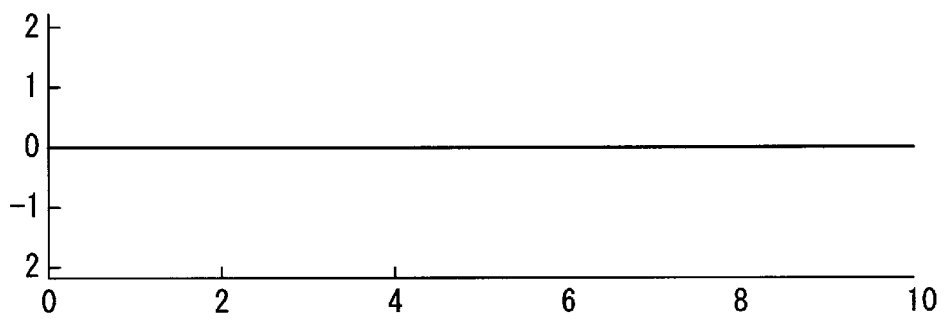
FIG. 30 is a diagram showing an example of the error detecting signal.

FIG. 30 shows the result of calculations for difference between the signal or demodulated signal (shown in FIG. 28) from the receiver 80 and the signal (shown in FIG. 29) from the modulator unit 71. It is to be noted from FIG. 30 that the difference (amplitude) is zero; this means that no errors were detected or the transmitted data was correctly demodulated.

The foregoing demonstrates that data transmitted by modulating signals of current from the electric appliance can be demodulated with certainty at the receiving side. The foregoing also demonstrates that modulation of current does not affect the operation of circuits including those of electric appliances. In addition, according to this embodiment, it is possible to perform accurate demodulation because the load of electric appliances is also taken into account for demodulation.

Transmission of data by modulation of signals of source voltage supplied to electric appliances or transmission of data by modulation of current from electric appliances obviates the necessity of constructing a new wire network for data transmission and reception and hence makes it possible to construct a simple network in a residence.

A series of processing (such as modulation) mentioned above may be carried out by using hardware as well as by using software. In the latter case, dedicated hardware incorporated with the software may be used or the software may be installed in a general-purpose personal computer from a recording medium.

FIG. 31 shows the internal construction of a general-purpose personal computer. The CPU (Central Processing Unit) 151 performs various processing according to the program stored in the ROM (Read Only Memory) 152. The RAM (Random Access Memory) 153 stores data and programs necessary for processing by the CPU 151 as the occasion demands. The input/output interface 155 has an input unit 156 (keyboard and mouse) connected thereto and is also connected to the CPU 151 to which are output signals entered through the input unit 156. To the input/output interface 155 are also connected the output unit 157 including a display and a speaker.

Moreover, to the input/output interface 155 are also connected the memory unit 158 including a hard disk and the communication unit 159 for transmission and reception of data to and from other apparatus through a network such as internet. The drive 160 includes a magnetic disk 171, optical disk 172, magneto-optical disk 173, and semiconductor memory 174, which are used to read and write data from and to a recording medium.

The recording medium may be in the form of magnetic disk 171 (including flexible disk), optical disk 172 (including CD-ROM [Compact Disc-Read Only Memory] and DVD [Digital Versatile Disc]), magneto-optical disk 173, MD (Mini-Disk®), and semiconductor memory 174, which are distributed to provide users with a program (as package media) which is separate from the personal computer shown in FIG. 31. The program may be preinstalled in the computer by means of ROM 152 and memory unit 158 including a hard disk.

The steps listed in the program provided through a recording medium may be executed in time sequence or in parallel or individually.

The term "system" as used in this specification means an entire unit consisting of a plurality of apparatus.

Effect of the Invention

As mentioned above, the information processing system according to the present invention consists of the following three information processing apparatus. The first information processing apparatus modulates current according to data to be transmitted and sends the first modulated current to the second information processing apparatus. The second information processing apparatus receives the third current which is synthesized from the first current and the second current output from the third information processing apparatus, estimates the second current, subtract the estimated second current from the third current entered, and extracts the first current, demodulates data from the extracted first current. The third information processing apparatus executes processing according to instructions of the first information processing apparatus. Thus, the present invention permits one to construct a simple and safe network.

The information processing apparatus, method, and program according to the present invention enter the third current synthesized from the first current modulated according to data and the second current from other apparatus, estimate the second current, subtract the second current from the third current, extract the first current, and demodulate data from the first current which has been extracted. Therefore, they permit demodulation of data from a network in a simple and safe manner.

What is claimed is:

1. An information processing system of the type having a first information processing apparatus to send data, a second information processing apparatus to receive and process said data, and a third information processing apparatus connected to said first information processing apparatus, wherein said first information processing apparatus contains a means to modulate current in response to data to be transmitted and a means to supply a first current which has been modulated by said modulating means to said second information processing apparatus; said second information processing apparatus contains a means to input a third current which has been synthesized from said first current supplied from said supply means and a second current output from said third information processing apparatus, a means to estimate said second current, a means to extract said first current by subtracting said second current (which has been estimated by said estimating means) from said third current which has been entered from said input means, and a means to demodulate said data from said first current extracted by said extracting means; and said third information processing apparatus contains a means to execute processing in response to instructions from said first information processing apparatus.

2. An information processing apparatus which comprises a means to input a third current which has been synthesized from a first current modulated in response to data and a second current output from another apparatus, a means to estimate said second current, a means to extract said first current by subtracting said second current (which has been estimated by said estimating means) from said third current which has been entered from said input means, and a means to demodulate said data from said first current extracted by said extracting means.

3. The information processing apparatus as defined in claim 2, wherein said estimating means samples the third current at a multiple of the frequencies of the power voltage applied to other apparatus and integrates the sampled values, thereby estimating the second current.

4. The information processing apparatus as defined in claim 3, wherein said estimating means performs sampling within a sampling time which is 50 times the frequency and processes the 50 sampled values in parallel.

5. The information processing apparatus as defined in claim 2, wherein said demodulating means judges the sign of the first current, thereby demodulating data.

6. An information processing method which comprises a step of controlling input of a third current which has been synthesized from a first current modulated in response to data and a second current output from other apparatus, a step of estimating said second current, a step of extracting said first current by subtracting said second current estimated in said estimating step from said third current whose input is controlled by processing in said input control step, and a step of demodulating said data from said first current extracted in said extracting step.

7. A recording medium storing a program that can be read by a computer, said program comprising a step of controlling input of a third current which has been synthesized from a first current modulated in response to data and a second current output from other apparatus, a step of estimating said second current, a step of extracting said first current by subtracting said second current estimated in said estimating step from said third current whose input is controlled by processing in said input control step, and a step of demodulating said data from said first current extracted in said extracting step.

8. A program to be executed by a computer, said program comprising a step of controlling input of a third current which has been synthesized from a first current modulated in response to data and a second current output from other apparatus, a step of estimating said second current, a step of extracting said first current by subtracting said second current estimated in said estimating step from said third current whose input is controlled by processing in said input control step, and a step of demodulating said data from said first current extracted in said extracting step.

* * * * *